(12) United States Patent
Kikuchi et al.

(10) Patent No.: US 7,940,322 B2
(45) Date of Patent: May 10, 2011

(54) FOCUS DETECTING DEVICE

(75) Inventors: Tetsuo Kikuchi, Hachioji (JP); Kosei Tamiya, Sagamihara (JP); Shiro Tsunai, Kanagawa (JP)

(73) Assignee: Olympus Imaging Corporation, Tokyo (JP)

( * ) Notice: Subject to any disclaimer, the term of this patent is extended or adjusted under 35 U.S.C. 154(b) by 543 days.

(21) Appl. No.: 12/070,860

(22) Filed: Feb. 21, 2008

(65) Prior Publication Data

US 2008/0212955 A1  Sep. 4, 2008

(30) Foreign Application Priority Data

Mar. 1, 2007 (JP) ................................. 2007-051750

(51) Int. Cl.
*H04N 5/232* (2006.01)

(52) U.S. Cl. ........ 348/345; 348/246; 348/294; 348/297; 348/350; 348/247; 396/92; 396/96; 396/104

(58) Field of Classification Search .................. 348/345
See application file for complete search history.

(56) References Cited

U.S. PATENT DOCUMENTS

| | | | | |
|---|---|---|---|---|
| 5,943,514 A | * | 8/1999 | Sato et al. | 396/96 |
| 6,681,078 B2 | * | 1/2004 | Yoshida et al. | 396/96 |

FOREIGN PATENT DOCUMENTS

| JP | 8-286104 A | 11/1996 |
|---|---|---|
| JP | 10-39202 A | 2/1998 |
| JP | 2006-208802 A | 8/2006 |

OTHER PUBLICATIONS

Chinese Office Action dated Aug. 14, 2009 (6 pages), and English translation thereof (8 pages), issued in counterpart Chinese Application Serial No. 200810080949.1.

* cited by examiner

*Primary Examiner* — Timothy J Henn
*Assistant Examiner* — Yih-Sien Kao
(74) *Attorney, Agent, or Firm* — Holtz, Holtz, Goodman & Chick, PC

(57) ABSTRACT

A focus detecting device includes a focus detecting optical system which forms a plurality of object images. A photoelectric conversion element array includes a plurality of pixels and subjects each of the plural object images formed by the focus detecting optical system to photoelectric conversion. An electric charge transfer path transfers an electric charge obtained by the photoelectric conversion subjected by the photoelectric conversion element array. A focus detecting section performs focus detection with respect to a plurality of focus areas on the basis of a signal associated with an electric charge transferred by the electric charge transfer path. A plurality of effective pixel regions corresponding to the plural focus areas are arranged in the arrangement direction of the pixels of the photoelectric conversion element array, and ineffective pixel regions are arranged between the plural effective pixel regions.

5 Claims, 5 Drawing Sheets

FOCUS DETECTING DEVICE

CROSS-REFERENCE TO RELATED APPLICATIONS

This application is based upon and claims the benefit of priority from prior Japanese Patent Application No. 2007-051750, filed Mar. 1, 2007, the entire contents of which are incorporated herein by reference.

BACKGROUND OF THE INVENTION

1. Field of the Invention

The present invention relates to a focus detecting device for detecting a focusing state in a plurality of focus areas.

2. Description of the Related Art

A focus detecting device of a phase difference detection system is known as one of focus detecting devices used for the automatic focusing camera. In the phase difference detection system, light flux from an object passing through different optical paths of a main optical system is divided in a pupil division optical system. The divided light flux components are image-formed on photoelectric conversion element arrays constituting a pair of line sensors. A focusing state in a focus area in an imaging plane is detected from a two-image interval of the object images forming a pair detected on these photoelectric conversion element arrays.

Further, in a focus detecting device of the phase difference detection system, in order to perform detection of an object image positioned in a wider area on the imaging plane, detection of the object image is performed by arranging a plurality of pairs of photoelectric conversion element arrays so as to allow them to correspond to a plurality of focus areas in the imaging plane. Such a focus detecting device capable of performing so-called multi-point focus detection is also proposed.

For example, in Jpn. Pat. Appln. KOKAI Publication No. 8-286104, charge accumulation control for focusing state detection is performed for each pair (called an island) constituted of a basis section and a reference section. In Jpn. Pat. Appln. KOKAI Publication No. 8-286104, a plurality of islands are arranged in parallel with the arraying direction of pixels of the photoelectric conversion element array, electric charges output from each of the islands are transferred through a common transfer path.

BRIEF SUMMARY OF THE INVENTION

According to a first aspect of the invention, there is provided a focus detecting device comprising: a focus detecting optical system which forms a plurality of object images; a photoelectric conversion element array which includes a plurality of pixels, subjecting each of the plural object images formed by the focus detecting optical system to photoelectric conversion; an electric charge transfer path which transfers an electric charge obtained by the photoelectric conversion subjected by the photoelectric conversion element array; and a focus detecting section which performs focus detection with respect to a plurality of focus areas on the basis of a signal associated with an electric charge transferred by the electric charge transfer path, wherein a plurality of effective pixel regions corresponding to the plural focus areas are arranged in the arrangement direction of the pixels of the photoelectric conversion element array, and ineffective pixel regions are arranged between the plural effective pixel regions.

According to a second aspect of the invention, there is provided a focus detecting device comprising: a focus detecting optical system which forms a plurality of object images; a plurality of photoelectric conversion element arrays each of which includes a plurality of pixels, arranged in parallel with each other in an arrangement direction of the pixels, and subjecting each of the plural object images formed by the focus detecting optical system to photoelectric conversion; a plurality of electric charge transfer paths which are provided so as to be correspondent to each of the photoelectric conversion element arrays, and transferring an electric charge obtained by the photoelectric conversion subjected by each of the photoelectric conversion element arrays; an electric charge/voltage converting section which converts an electric charge transferred thereto by each of the electric charge transfer paths into a voltage, and outputting the voltage; and a focus detecting section which performs focus detection with respect to a plurality of focus areas on the basis of a signal output from the electric charge/voltage converting section, wherein a plurality of effective pixel regions corresponding to the plural focus areas are arranged in the arrangement direction of the pixels of each of the photoelectric conversion element arrays, and at least one ineffective pixel region is arranged between the plural effective pixel regions in each of the photoelectric conversion element arrays.

According to a third aspect of the invention, there is provided a focus detecting device comprising: a focus detecting optical system which forms a plurality of object images; a plurality of photoelectric conversion element arrays each of which includes a plurality of pixels, arranged in parallel with each other in an arrangement direction of the pixels, and subjecting each of the plural object images formed by the focus detecting optical system to photoelectric conversion; a plurality of electric charge transfer paths which are provided so as to be correspondent to each of the photoelectric conversion element arrays, and transferring an electric charge obtained by the photoelectric conversion subjected by each of the photoelectric conversion element arrays; a plurality of electric charge/voltage converting sections which are provided so as to be correspondent to each of the electric charge transfer paths, converting an electric charge transferred from each of the photoelectric conversion element arrays into a voltage, and outputting the voltage; a focus detecting section which performs focus detection with respect to a plurality of focus areas on the basis of a signal output from the plural electric charge/voltage converting sections, wherein a plurality of effective pixel regions corresponding to the plural focus areas are arranged in the arrangement direction of the pixels of each of the photoelectric conversion element arrays, and at least one ineffective pixel region is arranged between the plural effective pixel regions in each of the photoelectric conversion element arrays.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodi ments given below, serve to explain the principles of the invention.

DETAILED DESCRIPTION OF THE INVENTION

An embodiment of the present invention will be described below with reference to the accompanying drawings.

Figure 1:
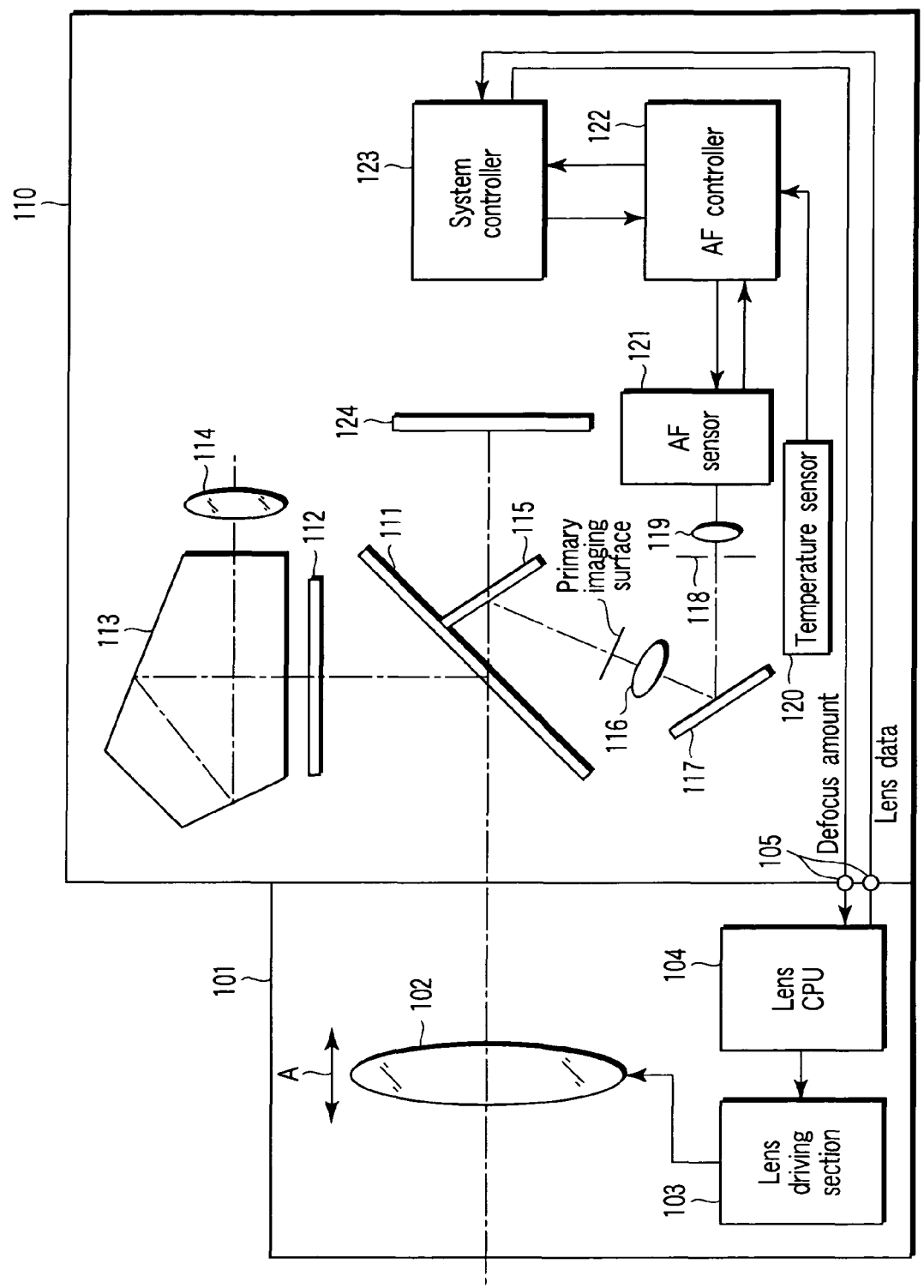
FIG. 1 is a view showing a configuration of a digital single-lens reflex camera as an example of an imaging apparatus including a focus detecting device according to an embodiment of the present invention.

FIG. 1 is a view showing a configuration of a digital single-lens reflex camera ("camera" hereinafter) as an example of an imaging apparatus including a focus detecting device according to an embodiment of the present invention. The camera shown in FIG. 1 includes an interchangeable lens 101 and a camera body 110.

The interchangeable lens 101 is configured to be detachably attachable to the camera body 110 through a camera mount (not shown) provided in front of the camera body 110. The interchangeable lens 101 includes a focus lens 102, a lens driving section 103, and a lens CPU 104. The focus lens 102 is a lens for focus adjustment included in the imaging optical system. The focus lens 102 is driven in the optical axis direction thereof (arrow A direction in FIG. 1) by the lens driving section 103. This allows the focus lens 102 to perform focus adjustment of the imaging optical system. As a result, light flux from an object (not shown) passing through the imaging optical system forms a focused image on an imaging device 124 in the camera body 110.

The lens driving section 103 is constituted of, for example, a driving mechanism made up of a driver, an ultrasonic motor, and the like. This lens driving section 103 receives a control signal from the lens CPU 104 so as to drive the focus lens 102.

The lens CPU 104 is a control circuit for performing control and the like of the lens driving section 103. The lens CPU 104 is connected to a system controller 123 in the camera body 110 through a communication connector 105 so that the CPU 104 can communicate with the controller 123. Various lens data used in the calculation of a defocus amount such as manufacturing variation information of the focus lens and aberration information of the focus lens which are stored in advance in, for example, the lens CPU 104 are transmitted to the system controller 123.

The camera body 110 includes a main mirror 111, a finder optical system, a submirror 115, an AF optical system, a temperature sensor 120, an AF sensor 121, an AF controller 122, a system controller 123, and an imaging device 124. The finder optical system is constituted of a focusing screen 112, a pentaprism 113, and an eyepiece 114. The AF optical system is constituted of a condenser lens 116, a total reflection mirror 117, a separator stop 118, and a separator lens 119.

The main mirror 111 is a mirror which is rotatable and a central part of which is constituted of a half mirror. When in the down position (position shown in FIG. 1), the main mirror 111 reflects a part of light flux from an object (not shown) incident on the inside of the camera body through the interchangeable lens 101, and transmits a part of the light flux. The light flux reflected by the main mirror 111 is image-formed on the focusing screen 112. The pentaprism 113 makes the image of the object formed on the focusing screen 112 incident on the eyepiece 114 as an erect image. The eyepiece 114 enlarges the object image from the pentaprism 113 so as to allow the user to observe the object image. In this manner, the state of the object (not shown) can be observed.

Figure 2:
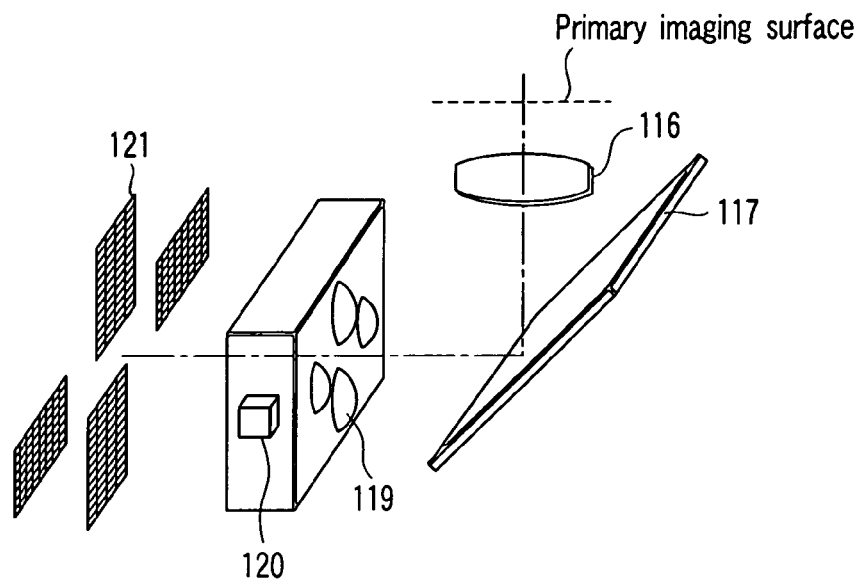
FIG. 2 is a view typically showing a secondary image forming system of an AF optical system.

The submirror 115 is provided at the rear of the half mirror part of the main mirror 111, and reflects light flux transmitted through the half mirror part of the main mirror 111 in the direction of the AF optical system. The condenser lens 116 condenses the light flux reflected by the submirror 115 and image-formed on a primary imaging surface, and makes the condensed light flux incident on the total reflection mirror 117. The total reflection mirror 117 reflects the light flux from the condenser lens 116 toward the AF sensor 121 side. The separator stop 118 is arranged in front of the AF sensor 121, and pupil-divides the light flux from the total reflection mirror 117. The separator lens 119 condenses the light flux pupil-divided by the separator stop 118, and forms the light flux into an image again on the AF sensor 121. The temperature sensor 120 is provided in the vicinity of the separator lens 119 in the manner shown in, for example, FIG. 2. The temperature sensor 120 detects the temperature around the separator lens 119, and outputs the detected temperature to the AF controller 122. As the temperature sensor 120, a known temperature sensor such as a thermistor can be used.

The AF sensor 121 converts the object image which is pupil-divided with parallax and image-formed again into an electric signal (object image signal), and outputs the electric signal to the AF controller 122. The AF sensor 121 is configured to be able to detect the focusing state in a plurality of focus areas (distance measuring points) in the imaging plane. The AF controller 122 that constitutes the focus detecting device together with the AF optical system and the AF sensor 121 performs operation control of the AF sensor 121. Further, the AF controller 122 calculates a two-image interval of the object images forming a pair obtained by pupil dividing from the object image signal output from the AF sensor 121 by, for example, correlation operation, calculates a defocus amount of the focus lens 102 at each distance measuring point from the calculated two-image interval, and outputs the calculated defocus amount to the system controller 123.

The system controller 123 performs operation control of the camera shown in FIG. 1. For example, at the time of automatic focus adjustment (AF), the system controller 123 transmits the defocus amount from the AF controller 122 to the lens CPU 104. The lens CPU 104 performs focus adjustment of the focus lens 102 on the basis of the defocus amount. Further, at the time of imaging, the system controller 123 subjects the object image signal obtained by the imaging device 124 to various types of image processing, and thereafter records the image data obtained by the image processing in a recording section (not shown).

When the main mirror 111 is retracted from the position shown in FIG. 1, the imaging device 124 converts the object image formed thereon through the imaging optical system into an electric signal.

Figure 3A:
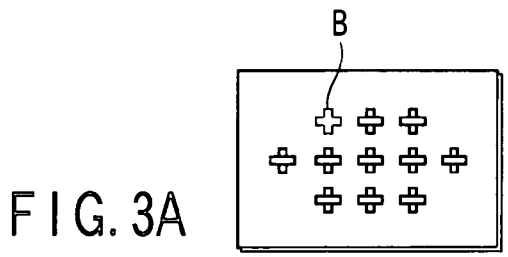
FIG. 3A is a view showing an example of an arrangement of distance measuring points.
Figure 3B:
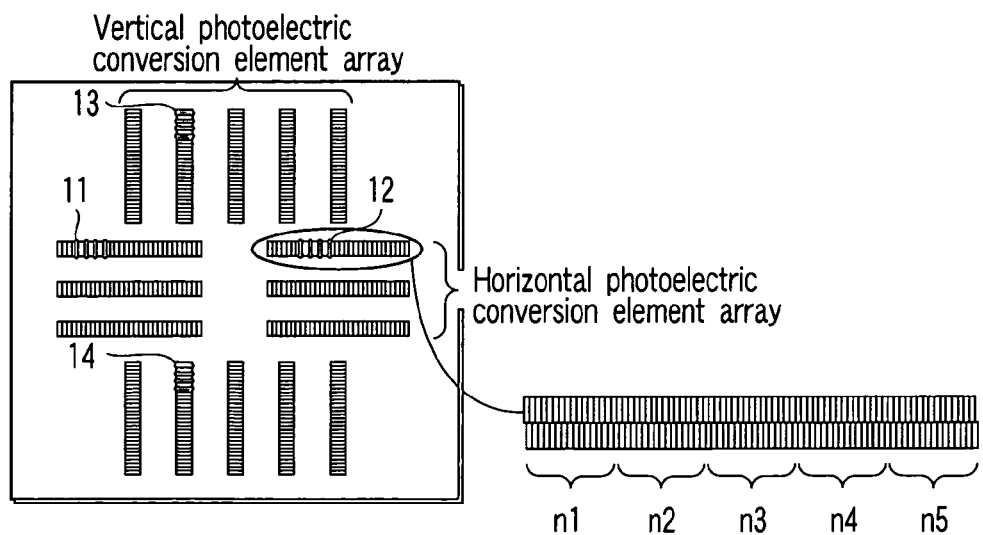
FIG. 3B is a view showing an example of an arrangement of photoelectric conversion element arrays of an AF sensor for detecting focusing states in the arrangement of distance measuring points shown in FIG. 3A.

The AF sensor 121 shown in FIG. 1 will be further described below. FIG. 3A is a view showing an example of a distance measuring point arrangement. FIG. 3B is a view showing an example of an arrangement of a line sensor for detecting a focusing state in the distance measuring point arrangement shown in FIG. 3A. Incidentally, FIG. 3B particularly shows the arrangement of photoelectric conversion element arrays of the line sensor.

Here, the example shown in FIG. 3B is an example in which a focusing state of a distance measuring point is detected by two islands in the horizontal direction and the vertical direction (a pair of an effective pixel region of a basis section and an effective pixel region of a reference section).

Further, one island is normally constituted of one line of the line sensor. However, in this embodiment, one island is constituted of a plurality of lines (two lines in FIG. 3B) of line sensors shifted from each other in a staggered arrangement. Incidentally, in the example shown in FIG. 3B, the line sensors are arranged so as to be shifted from each other by a distance corresponding to half a pixel. An island is constituted of a plurality of line sensors arranged so as to be shifted from each other, a correlation operation is performed for each of the line sensors to thereby calculate a two-image interval, and an average of the two-image interval is calculated, whereby it is possible to reduce the noise (mainly shot noise) in a signal detected in the line sensor, and errors appearing in one pixel period in a signal detected from the line sensor.

Further, in this embodiment, by providing a plurality of effective pixel regions in one line of the photoelectric conversion element array, a plurality of islands are arranged in one line of photoelectric conversion elements. For example, in the horizontal line sensor shown in, for example, FIG. 3B, five effective pixel regions n1 to n5 are provided in one line of photoelectric conversion element array. Further, although not shown, in the vertical line sensor, three effective pixel regions are provided.

In the arrangement of the line sensors shown in FIG. 3B, when attention is paid to, for example, a distance measuring point B shown in FIG. 3A, the focusing state at the distance measuring point B is detected by a pair of the effective pixel region 11 of the basis section horizontal line sensor and the effective pixel region 12 of the reference section horizontal line sensor, and a pair of the effective pixel region 13 of the basis section vertical line sensor and the effective pixel region 14 of the reference section vertical line sensor.

Figure 4:
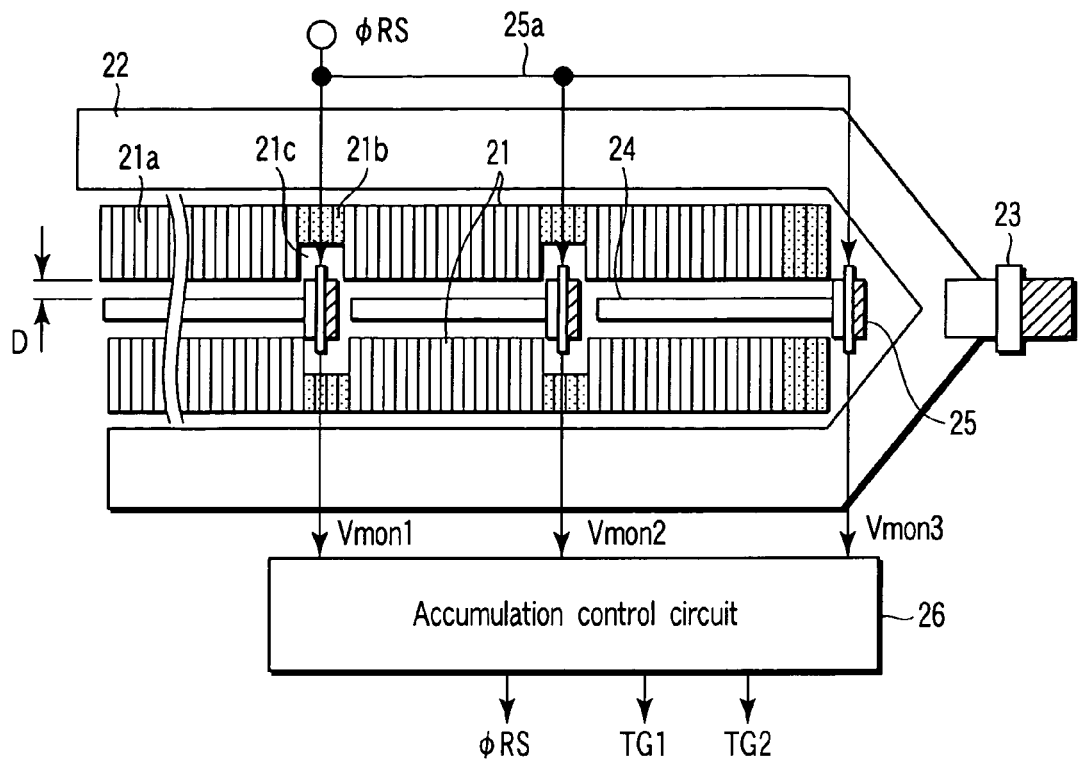
FIG. 4 is a view showing a detailed configuration of a line sensor.

FIG. 4 is a view showing a detailed configuration of a line sensor. As shown in FIG. 4, the line sensor includes a photoelectric conversion element array 21, an electric charge transfer path (CCD) 22, a CCD charge detecting section 23, monitor photodiodes (MPD) 24, MPD charge detecting sections 25, and an accumulation control circuit 26.

As described above, the photoelectric conversion element array 21 is constituted of a plurality of (two lines in FIG. 4) photoelectric conversion element arrays. One photoelectric conversion element array is configured in such a manner that a plurality of effective pixel regions 21a are arranged therein, and ineffective pixel regions 21b are arranged between the effective pixel regions 21a. The effective pixel region 21a is configured in such a manner that pixels (constituted of, for example, photodiodes) for receiving the object image corresponding to the distance measuring points shown in FIG. 3A, and converting the received object image into a charge amount by photoelectric conversion are arranged therein. Further, the ineffective pixel region 21b is provided for the purpose of stabilizing an electric charge amount obtained by the effective pixel (that is, a pixel disposed at an end of the effective pixel region 21a) adjacent to the ineffective pixel region 21b. The ineffective pixel region 21b is, like the effective pixel region 21a, configured in such a manner that pixels constituted of, for example, photodiodes are arranged therein.

In this embodiment, the ineffective pixel region 21b is configured in such a manner that a width (that is, a width in the vertical direction of FIG. 4) in the direction perpendicular to the arrangement direction of the pixels of the ineffective pixel region 21b is smaller than a width in the direction perpendicular to the arrangement direction of the pixels of the effective pixel region 21a. The MPD charge detecting section 25 is arranged in a space formed by the ineffective pixel regions 21b and the effective pixel regions 21a which are configured in the manner described above. Further, a wire 25a of the MPD charge detecting section 25 is arranged on the ineffective pixel region 21b.

The CCD 22 is arranged in the vicinity of the photoelectric conversion element array 21, and transfers an electric charge output from each pixel of the photoelectric conversion element array 21 in sequence for each pixel to the CCD charge detecting section 23. In the example shown in FIG. 4, the two lines of the photoelectric conversion element arrays share the CCD 22 with each other. When the electric charge is read, first an electric charge is transferred from one photoelectric conversion element array, and then an electric charge is transferred from the other photoelectric conversion element array.

The CCD charge detecting section 23 is provided at one end (right end in FIG. 4) of the CCD 22, converts an electric charge transferred in sequence from the CCD 22 into a voltage signal for each pixel, and outputs the voltage signal to the AF controller 122.

Each of the MPDs 24 is arranged between the photoelectric conversion element arrays so as to correspond to each effective pixel region 21a. The MPD 24 receives light corresponding to light averagely received by each effective pixel region 21a, converts the received light into an electric charge by photoelectric conversion, and outputs the electric charge to the MPD charge detecting section 25 as an accumulated electric charge amount of each effective pixel region 21a. As shown in FIG. 4, the MPDs 24 are provided so as to correspond to each effective pixel region 21a, whereby it is possible to monitor the accumulated electric charge amount for each island, and perform fine electric charge accumulation control for each island.

The MPD charge detecting section 25 is provided at an end of each MPD 24, converts an electric charge output from each MPD 24 into a voltage signal Vmon (in FIG. 4, three voltage signals of Vmon1 to Vmon3 are shown), and outputs the voltage signal to the accumulation control circuit 26.

The accumulation control circuit 26 outputs a control signal on the basis of the voltage signal Vmon output from the MPD charge detecting section 25 so as to perform accumulation control of each island. Here, a control signal ϕRS is a signal for resetting a charge accumulated in each MPD charge detecting sections 25. Further, a control signal TG1 is a signal for controlling the electric charge accumulating operation of each island. Furthermore, a control signal TG2 is a signal for controlling electric charge reading from each island.

Here, in order to correctly detect a focusing state at each distance measuring point, it is necessary to avoid a state where the image of the main object which is an object of AF does not reach the focus area. For this purpose, it is necessary to arrange the islands as close as possible to each other. In this embodiment, the interval between the photoelectric conversion element arrays which are shifted from each other in a staggered arrangement is made as small as possible, and a plurality of effective pixel regions 21a are arranged in one photoelectric conversion element array, thereby reducing the intervals between the effective pixel regions 21a (that is, the intervals between the ineffective pixel regions 21b) as much as possible.

Here, if the ineffective pixel regions 21b are eliminated, the electric charge amount of each of the pixels adjacent to the ineffective pixel region 21b becomes unstable. Accordingly, it becomes impossible to treat the adjacent pixels as effective pixels. It is desirable that the intervals between the ineffective pixel regions 21b be minimized within such a range that an electric charge amount of each of effective pixels adjacent to the ineffective pixel region 21b is stable.

Further, in this embodiment, the fact that the ineffective pixel region 21b is not needed for focusing state detection is utilized to form the ineffective pixel region 21b smaller than the effective pixel region 21a, and the MPD charge detecting section 25 is arranged in a space 21c formed by the ineffective pixel regions 21b and the effective pixel regions 21a.

Figure 5:
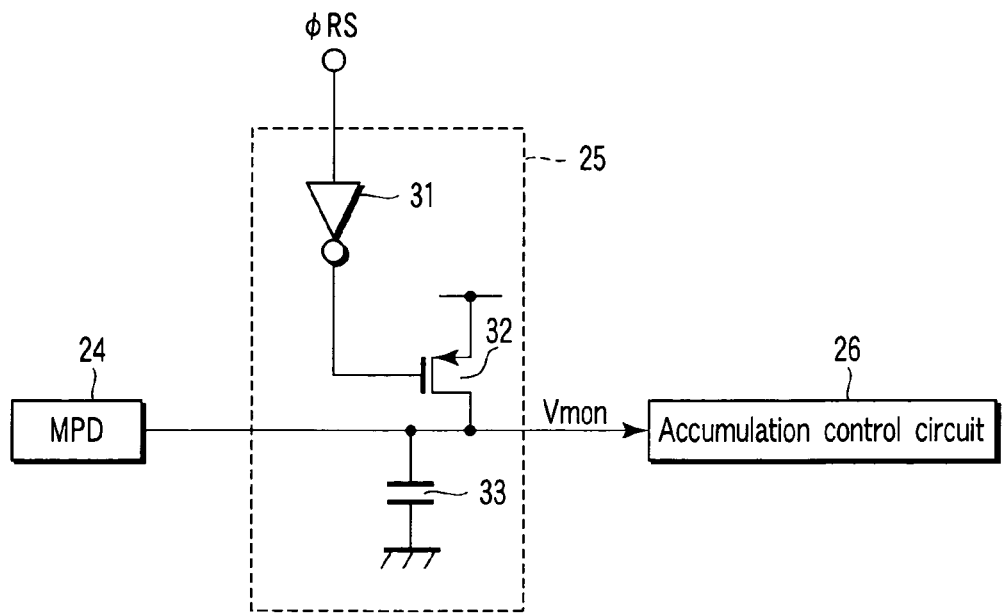
FIG. 5 is an electric circuit diagram showing a configuration of an MPD electric charge detecting section.

FIG. 5 is an electric circuit diagram showing the configuration of the MPD charge detecting section 25. As shown in FIG. 5, the MPD charge detecting section 25 is constituted of an inverter 31, a transistor 32, and a capacitor 33. By arranging the elements shown in FIG. 5 in the space 21c, it is possible, even when the photoelectric conversion element array 21 and the MPD 24 are arranged close to each other, to secure a space in which the MPD charge detecting sections 25 is to be arranged.

Here, the operation of the MPD charge detecting sections 25 shown in FIG. 5 will be briefly described below. When the control signal φRS from the accumulation control circuit 26 is switched from the high level to low, the electric charge accumulated in the capacitor 33 is reset. As a result of this, an electric charge output from the MPD 24 is accumulated in the capacitor 33. A voltage signal generated by the electric charge accumulating operation is output to the accumulation control circuit 26 as a voltage Vmon.

Although FIG. 5 shows the MPD charge detecting sections 25, the CCD charge detecting section 23 also has a configuration conforming to FIG. 5.

Further, in this embodiment, the wire 25a for the MPD charge detecting section 25 is arranged on the ineffective pixel region 21b. Although it is possible to arrange the wire 25a between the photoelectric conversion element array 21 and the MPD 24, if the wire 25a is arranged so, the distance D between the photoelectric conversion element array 21 and the MPD 24 becomes large, deterioration of the accumulation control accuracy, and the possibility of the far/near mixture object are increased. In contrast, by arranging the wire 25a for the MPD charge detecting section 25 on the ineffective pixel region 21b as in this embodiment, it is possible to arrange the photoelectric conversion element array 21 and the MPD 24 in such a manner that the distance D between the photoelectric conversion element array 21 and the MPD 24 becomes small.

Figure 6:
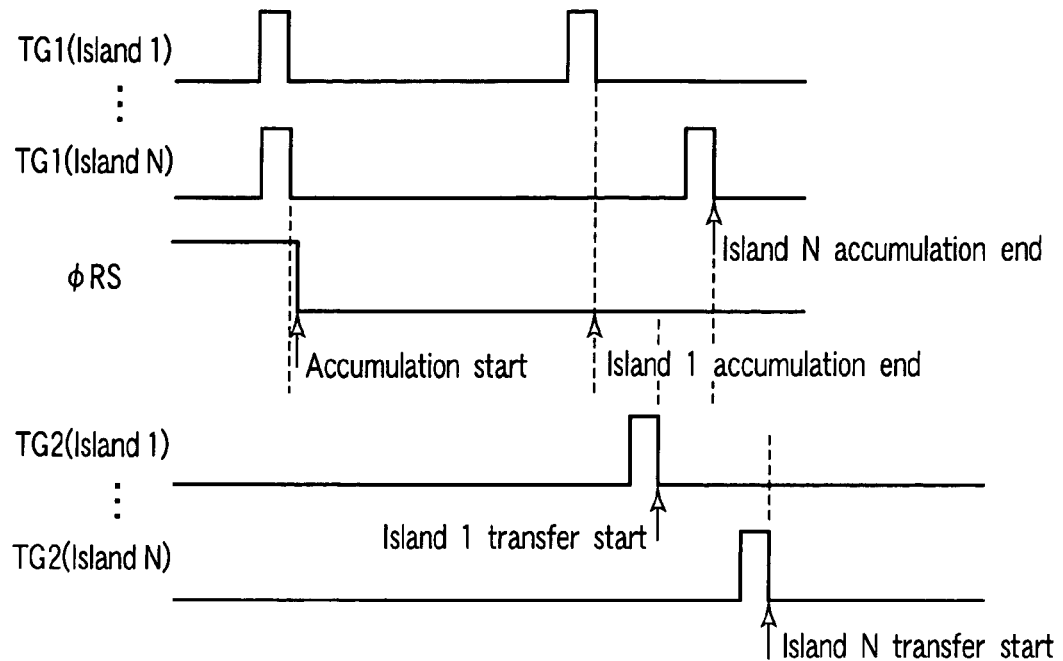
FIG. 6 is a timing chart showing accumulation control operations in the AF sensor.
Figure 7:
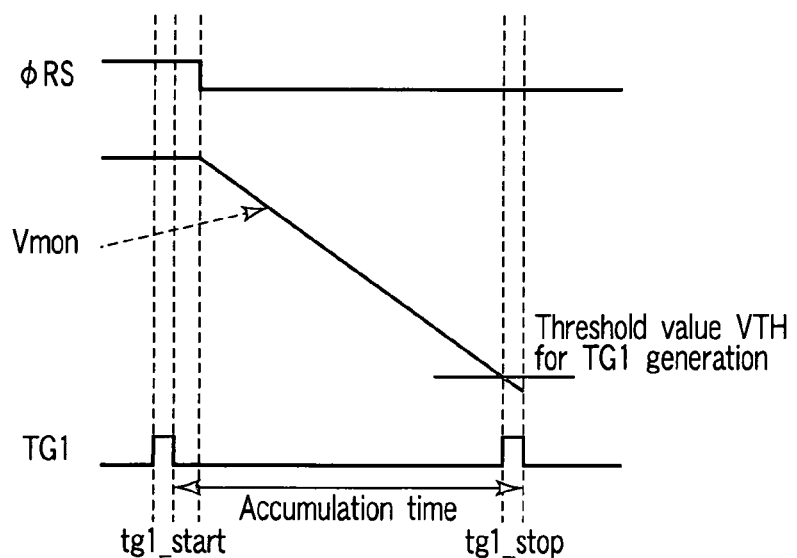
FIG. 7 is a view showing an outline of the accumulation control using monitor photodiodes.

The operation of the above-mentioned AF sensor 121 will be described below. FIG. 6 is a timing chart showing the accumulation control operation in the AF sensor 121. Further, FIG. 7 is a view showing an outline of the accumulation control using the MPD.

When AF is started, the control signal φRS from the accumulation control circuit 26 is switched from high level to low in the manner shown in FIG. 6. In response to this, electric charges accumulated in the CCD charge detecting section 23 and the MPD charge detecting sections 25 are reset. Further, at substantially the same timing at which the control signal φRS is switched to low, a control signal TG1 is supplied from the accumulation control circuit 26 to each island arranged in the photoelectric conversion element array 21. As a result, an electric charge accumulating operation is started in each island.

When the electric charge accumulating operation in each island is started, an electric charge amount accumulated in each island is detected at the MPD 24 provided so as to be correspondent to each island. The electric charge detected at the MPD 24 is converted into a voltage signal Vmon at the MPD charge detecting sections 25, and is thereafter output to the accumulation control circuit 26.

The accumulation control circuit 26 compares the voltage signal Vmon from each MPD charge detecting section 25 with a predetermined voltage VTH for TG1 generation. When the voltage signal Vmon exceeds the voltage VTH, the accumulation control circuit 26 supplies the control signal TG1 to a corresponding island so as to terminate the electric charge accumulating operation in the corresponding island. Incidentally, the voltage VTH can be appropriately adjusted in accordance with the specification or the like of the AF sensor 121.

After terminating the electric charge accumulating operation of the island, the accumulation control circuit 26 supplies the control signal TG2 to the island, and starts reading of the electric charge from the corresponding island. The read electric charge is transferred by the CCD 22 to the CCD charge detecting section 23 so as to be converted into a voltage signal (object image signal). Thereafter, the object image signal is digitized at the AF controller 122 so as to be taken therein.

The object image is read at the AF controller 122, and thereafter the read object image signal is subjected, in the AF controller 122, to various correction such as correction for an offset resulting from a dark current component or the like, and correction for variation of the AF sensor output in the illuminance resulting from lowering of the peripheral light amount in the AF optical system, variation of pixels constituting the photoelectric conversion element array in the sensitivity, and the like. After such various correction is performed, a two-image interval is calculated from the object images forming a pair of the basis section and the reference section by the correlation operation. Thereafter, the reliability of the correlation operation result is determined. If the reliability of the correlation operation result is high, it is recognized that the two-image interval is correctly obtained, a defocus amount is calculated from the obtained two-image interval by using an optically calculated defocus coefficient. Incidentally, when a plurality of highly reliable two-image intervals are obtained, one two-image interval is selected from the plural values, and a defocus amount is calculated on the basis of the selected two-image interval. As the method of thinking the selection, there is a method in which for example, of the obtained two-image intervals, a two-image interval of a distance measuring point corresponding to the nearest point is selected.

After the defocus amount is calculated, the calculated defocus amount is subjected to various correction such as temperature correction based on the temperature detected by the temperature sensor 120, correction for an error resulting from the individual variation of the camera body 110, correction for an error resulting from the individual variation of the imaging optical system, and the like. Thereafter, the defocus amount calculated in the AF controller 122 is output to the system controller 123. The defocus amount is transferred from the system controller 123 to the lens CPU 104. Then, focusing drive of the focus lens 102 is performed under the control of the lens CPU 104.

As described above, according to this embodiment, a plurality of effective pixel regions 21a are arranged in one line of the photoelectric conversion element array so as to be in close contact with each other, whereby the image of the main object can be reliably detected. Further, the ineffective pixel regions 21b are arranged between the effective pixel regions 21a, whereby an electric charge amount at each end of the effective pixel regions 21a can be stabilized. This makes it possible to utilize signals from all the pixels in the effective pixel regions 21a for focusing state detection.

Further, according to this embodiment, a plurality of photoelectric conversion element arrays 21 are shifted from each other in a staggered arrangement so as to be formed into an island, whereby it is possible to reduce noise in a signal detected by the line sensor, and errors appearing in a pixel period in a signal detected from the line sensor.

Furthermore, when the photoelectric conversion element arrays 21 are arranged in a staggered form, it is necessary to arrange a plurality of photoelectric conversion element arrays so as to be in close contact with each other, and arrange an MPD 24 in the vicinity of each photoelectric conversion element array 21. At this time, in order to arrange the MPD charge detecting section 25, it is necessary to secure a certain degree of space. In this embodiment, each pixel of the ineffective pixel region 21b is formed smaller than each pixel of the effective pixel region 21a, whereby it is possible to utilize a space 21c thereby formed as a space for arranging the MPD charge detecting section 25. Further, the signal of the ineffective pixel region 21b need not be utilized, and hence it is possible to arrange the wire 25a on this part, and make the distance D between the photoelectric conversion element array 21 and the MPD 24 small.

Figure 8:
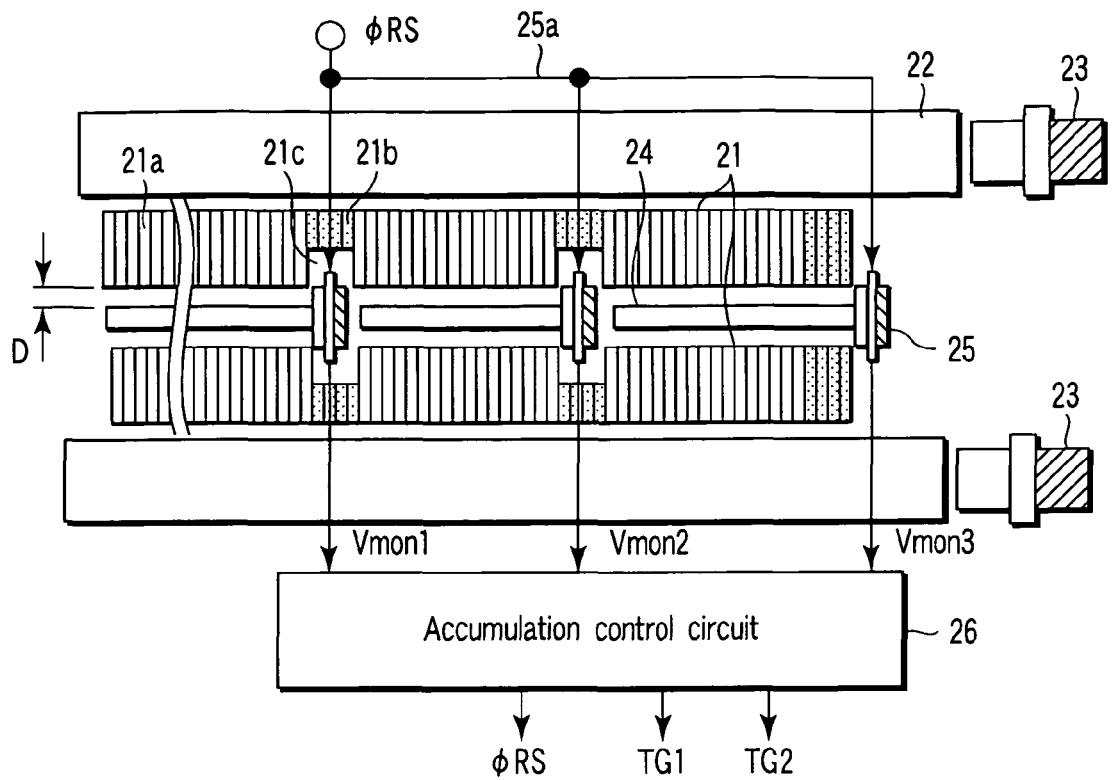
FIG. 8 is a view showing a configuration of a first modification example of the embodiment of the present invention.
Figure 9:
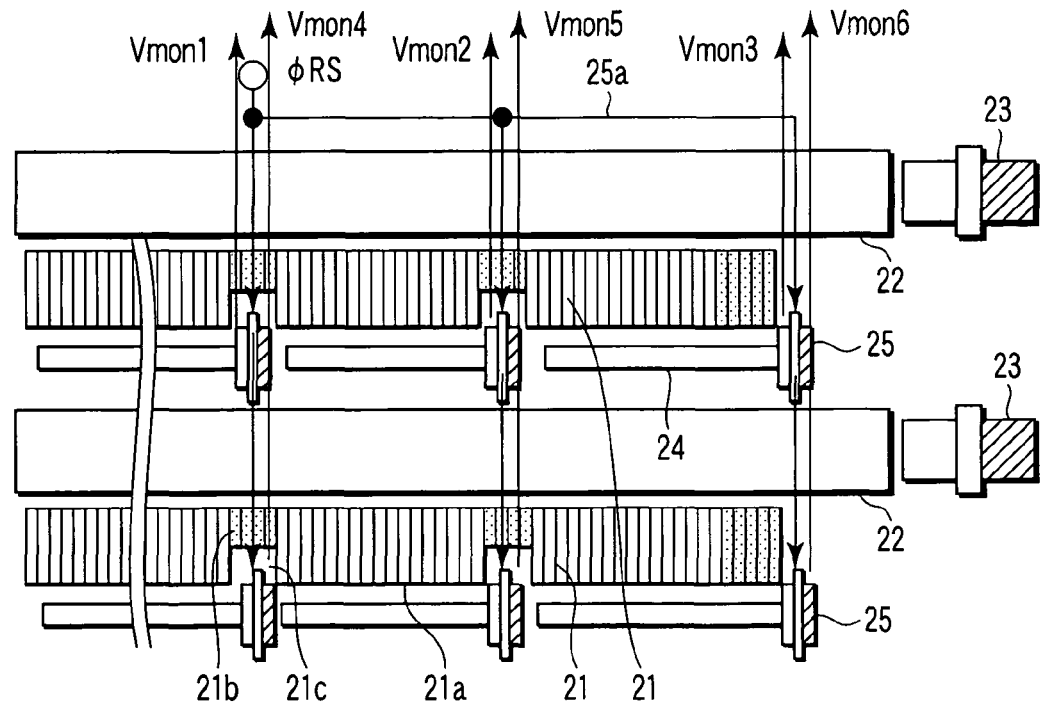
FIG. 9 is a view showing a configuration of a second modification example of the embodiment of the present invention.

The configuration of the line sensor in the embodiment described above is only an example, and the method of the present invention can also be applied to a line sensor having a different configuration. For example, FIG. 8 shows an example of a case where the method of this embodiment is applied to a line sensor having a configuration in which a CCD 22 and a CCD charge detecting section 23 are provided for each of two photoelectric conversion element arrays 21. The MPDs 24 are arranged between the two photoelectric conversion element arrays 21, and the accumulated electric charge amount of each of the two photoelectric conversion element arrays 21 can be simultaneously monitored by one MPD 24. Further, FIG. 9 shows an example of a case where the method of this embodiment is applied to a line sensor having a configuration in which a CCD 22, a CCD charge detecting section 23, MPDs 24, and MPD charge detecting sections 25 are provided individually for one photoelectric conversion element array 21.

Here, in each of the configurations shown in FIGS. 4 and 8, the effective pixel regions 21a constituting one island are subjected to accumulation control by using a common MPD 24. In contrast, in the configuration shown in FIG. 9, all the effective pixel regions 21a are subjected to accumulation control by using individual MPDs 24. Accordingly, the configuration shown in FIG. 9 can also be applied to a line sensor having a configuration in which each effective pixel region 21a is made one island (one distance measuring point).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A focus detecting device comprising:
a focus detecting optical system which forms a plurality of object images;
a plurality of photoelectric conversion element arrays each of which includes a plurality of pixels, wherein the photoelectric conversion element arrays subject each of the plural object images formed by the focus detecting optical system to photoelectric conversion, and wherein the photoelectric conversion element arrays are arranged in parallel with each other in an arrangement direction of the pixels;
an electric charge transfer path which transfers an electric charge obtained by the photoelectric conversion performed by the photoelectric conversion element arrays; and
a focus detecting section which performs focus detection with respect to a plurality of focus areas based on a signal associated with the electric charge transferred by the electric charge transfer path;
wherein the photoelectric conversion element arrays each include a plurality of effective pixel regions corresponding to the plural focus areas and which are arranged in the arrangement direction of the pixels of the photoelectric conversion element arrays, and ineffective pixel regions which are arranged between the plural effective pixel regions; and
wherein the focus detecting device further comprises:
a plurality of monitor photodiodes which are provided between the photoelectric conversion element arrays and which are arranged so as to correspond to the plurality of effective pixel regions, the monitor photodiodes monitoring an electric charge amount obtained by each of the photoelectric conversion element arrays; and
a plurality of monitor photodiode charge detecting sections each of which is arranged in a space formed by each of the ineffective pixel regions and the effective pixel regions, wherein the monitor photodiode charge detecting sections detect electric charges of the plural monitor photodiodes.

2. The focus detecting device according to claim 1, further comprising:
an accumulation control section which controls an electric charge accumulating operation in each photoelectric conversion element array based on an output of each monitor photodiode charge detecting section; and
a plurality of wires each of which is arranged in each ineffective pixel region, and which electrically connect each monitor photodiode charge detecting section and the accumulation control section to each other.

3. The focus detecting device according to claim 1, wherein a width of each ineffective pixel region in a direction perpendicular to the arrangement direction of the pixels is smaller than a width of each effective pixel region in the direction perpendicular to the arrangement direction of the pixels.

4. The focus detecting device according to claim 1, further comprising an electric charge/voltage converting section which converts an electric charge transferred thereto by each of the electric charge transfer paths into a voltage, and which outputs the voltage.

5. A focus detecting device comprising:
a focus detecting optical system which forms a plurality of object images;
a plurality of photoelectric conversion element arrays each of which includes a plurality of pixels, wherein the photoelectric conversion element arrays subject each of the plural object images formed by the focus detecting optical system to photoelectric conversion, and wherein the photoelectric conversion element arrays are arranged in parallel with each other in an arrangement direction of the pixels;

an electric charge transfer path which transfers an electric charge obtained by the photoelectric conversion performed by the photoelectric conversion element arrays; and a focus detecting section which performs focus detection with respect to a plurality of focus areas based on a signal associated with the electric charge transferred by the electric charge transfer path;

wherein the photoelectric conversion element arrays each include a plurality of effective pixel regions corresponding to the plural focus areas and which are arranged in the arrangement direction of the pixels of the photoelectric conversion element arrays, and ineffective pixel regions which are arranged between the plural effective pixel regions;

wherein the focus detecting device further comprises:

a plurality of monitor photodiodes which are provided between the photoelectric conversion element arrays and which are arranged so as to correspond to the plurality of effective pixel regions, the monitor photodiodes monitoring an electric charge amount obtained by each of the photoelectric conversion element arrays; and a plurality of monitor photodiode charge detecting sections each of which is arranged in a vicinity of each of the ineffective pixel regions, and wherein the monitor photodiode charge detecting sections detect electric charges of the plural monitor photodiodes; and wherein a width of each ineffective pixel region in a direction perpendicular to the arrangement direction of the pixels is smaller than a width of each effective pixel region in the direction perpendicular to the arrangement direction of the pixels.

* * * * *

UNITED STATES PATENT AND TRADEMARK OFFICE
CERTIFICATE OF CORRECTION

PATENT NO. : 7,940,322 B2
APPLICATION NO. : 12/070860
DATED : May 10, 2011
INVENTOR(S) : Tetsuo Kikuchi It is certified that error appears in the above-identified patent and that said Letters Patent is hereby corrected as shown below:

On the title page:

Under item (73) Assignee;

after "Olympus Imaging Corporation, Tokyo (JP)"

insert: --Olympus Corporation, Tokyo (JP)

RENESAS Electronics Corporation, Kanagawa (JP)--

Signed and Sealed this
Thirteenth Day of September, 2011

David J. Kappos
*Director of the United States Patent and Trademark Office*